July 13, 1965   T. H. MOLLENKAMP   3,194,082
DRIVE BELTS
Filed July 16, 1963
Fig. 1
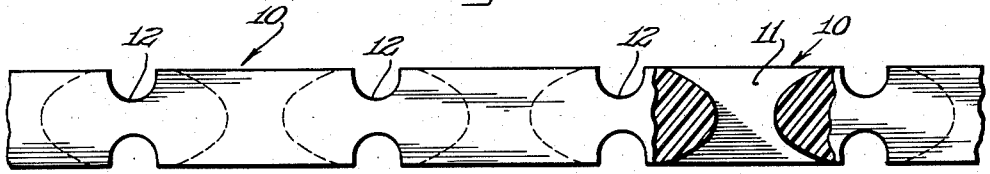
Fig. 2
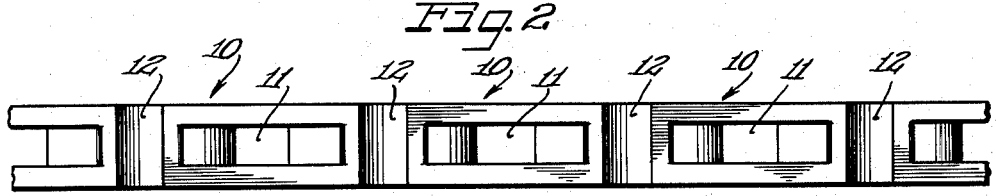
Fig. 3
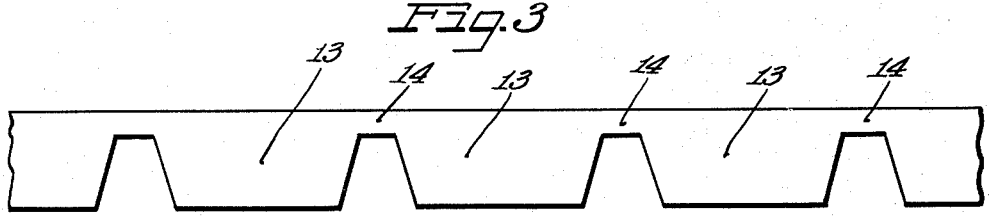
Fig. 5
Fig. 4   Fig. 6
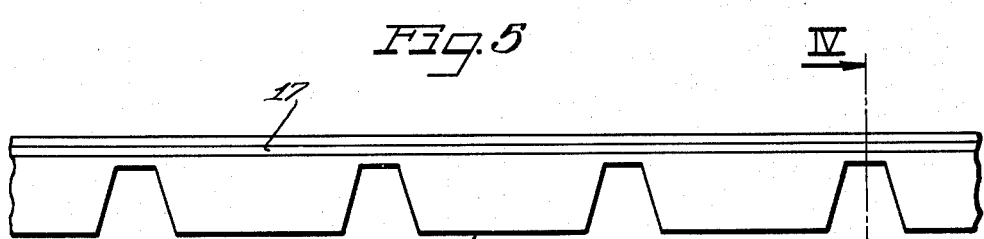
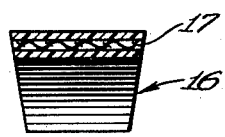  
INVENTOR.
Thomas H. Mollenkamp
BY
ATTORNEYS

United States Patent Office 3,194,082
Patented July 13, 1965

3,194,082
DRIVE BELTS
Thomas H. Mollenkamp, 46 Braeland Ave.,
Newton Center, Mass.
Filed July 16, 1963, Ser. No. 295,325
10 Claims. (Cl. 74—231)

The present invention relates to flexible belts, chains, conveyors and the like. The structure of the present invention has applicability in a wide variety of fields including V-belts used in automotive, appliance, and industrials applications, flat belts, round belts of the type used in sewing machines, movie projectors, television tuners, and the like, link chains of the type used for bicycles, conveyors, chain drives, and timing chains and the like, as well as table top belts, moving sidewalks, and conveyors of all types.

Existing drive belts, such as those composed of reinforced rubber evidence a slipping problem and have the further disadvantage of being relatively expensive. The present invention provides an improved structure for drive belts composed of a low cost material which has superior strength characteristics.

An object of the present invention is to provide a drive belt structure which takes advantage of certain unique properties of a class of thermoplastic resins.

Still another object of the invention is to provide a low cost drive belt structure having substantially improved strength properties.

Still another object of the invention is to provide a flexible belt structure capable of achieving 100% efficiency in an idler pulley from the drive pulley.

Essentially, the present invention provides a belt structure consisting of an endless loop composed of a material having integral hinge properties, the loop having spaced areas of reduced thickness providing integral hinges in these areas, the reduced area portions being molecularly oriented to provide substantial tensile strength in these areas.

While the present invention is applicable to all types of materials which have integral hinge properties, now known or subsequently developed, it is presently involved primarily with polymers of propylene. By a "polymer of propylene" I mean homopolymers of propylene or copolymers of propylene with other unsaturated monomers which exhibit the same type of physical properties possessed by the homopolymers of propylene.

Polypropylene is a tough, lightweight plastic material usually made by the polymerization of high purity propylene gas in the presence of an organometallic catalyst at relatively low pressures and temperatures. The material is composed of large, chain-like molecules which are exceptionally regular in structure.

Polypropylene polymers can exist in various structural forms. Such polymers generally consist of a chain of unsymmetrical propylene molecules combined head to tail with their methyl groups occupying the same relative position in space along the chain. This arrangement is known as the "isotactic" arrangement. In this type of arrangement, the molecules spiral either clockwise or counterclockwise, the two forms being identified as the "$d$" or "$l$" form. Both have identical properties in other respects. The isotactic molecules crystallize resulting in a resin of high strength, hardness and heat resistance.

The propylene monomer can form long molecules in which the position of the methyl groups is more or less random. Because of the non-regular spacing of the methyl groups, this amorphous or "atactic" polypropylene is incapable of crystallization. The material is very flexible and tacky and has very low tensile strength.

Another arrangement possible in the methyl groups is one in which they alternate regularly on opposite sides of the chain. This is called a syndiotactic structure. Still another form of polypropylene is the stereoblock configuration. These polymers exhibit the widest variety of physical characteristics because they are either a combination of both "$d$" and "$l$" isotactic segments, or one of these in combination with atactic or syndiotactic segments. Through the use of selective processing techniques, together with the proper catalyst, it is possible to produce resins with specific properties and the desired molecular weights. Most polypropylene formulations consist of about 90% of either the isotactic or stereoblock configuration.

Under various conditions, propylene can be polymerized to produce a low molecular weight, a medium molecular weight, or a high molecular weight polymer. A high molecular weight propylene has better impact properties than a low molecular weight resin. On the other hand, the high molecular weight material is more difficult to process. For the purposes of the present invention, all of the different types of polypropylene can be used with due regard for the properties desired in the belt.

One of the unique feature of polypropylene is its ability to form an integral hinge. The hinge is very tough and highly resistant to fatigue from flexing.

The integral hinge capable in polypropylene structures is possible because of the molecular orientation induced in the hinge by flexing. Repeated flexing of the hinge causes the polypropylene molecules to align themselves perpendicular to the length of the hinge, concentrating the molecular chain strength in the direction of alignment. For the purposes of the present invention, the molecular orientation may exist only in the integral hinge sections, that is, the sections of lesser thickness, or it may extend through the whole belt. Furthermore, the belt may be biaxially oriented, that is, it may be strengthened in its lengthwise as well as in its transverse direction to produce a completely tough, high tensile strength material.

The belt of the present invention can be made by a variety of processes. Perhaps the most suitable for general use is the process of injection molding. In molding the integral hinge, it is important that the polymer melt and fill the mold and flow into the restricted hinge area without interrupion. Any momentary flow stoppage in this area damages the hinge by forming a weld line, lamination, or the like and prevents proper fill of the mold cavity beyond the hinge.

Perhaps the simplest method of securing molecular orientation of the resin in the hinge area is by means of flexing. This can be accomplished conveniently by passing the preformed belt shortly after it is removed from the mold over relatively small idler pulleys to impart the necessary orientation effect, while using a fairly light loading to keep the thin sections from rupturing prior to orientation. Another technique consists in drawing the belt while it is warm, in a manner similar to that employed for orientating polypropylene film.

Hinges can also be formed by either pressing a hot die into a cold sheet of polypropylene, or by pressing a cold die into a hot sheet of the material. Typically, the die temperature is on the order of 450° F. When the entire sheet itself is heated, and a cold die is employed, the sheet should be heated to temperatures of 250° F. or higher when the stamping die is at room temperature.

The hinges can also be produced by extrusion processes wherein some orientation is induced in the polypropylene by the process itself. However, the orientation is usually in the direction parallel to the hinge whereas for proper molecular orientation, it is desired that the orientation exist perpendicular to the hinge.

While the belts and chains of the present invention are quite strong, exceeding the strength of rubber, it may be desirable for some applications to reinforce the belt for even greater strength. For these types of applications, it is recommended that fibers such as asbestos, nylon, or even metal be employed. Alternatively, the entire belt or particular areas thereof can be reinforced with suitable fabric reinforcing of the type commonly employed in reinforcing rubber belts.

A further description of the present invention will be made in conjunction with the attached sheet of drawings which illustrates several embodiments.

In the drawings:

FIGURE 1 is a view in elevation of a link chain type structure produced according to the present invention;

FIGURE 2 is a plan view of the structure shown in FIGURE 1;

FIGURE 3 is a V-belt type construction, in elevation, according to the present invention;

FIGURE 4 is a cross-section of the V-belt construction shown in FIGURE 5;

FIGURE 5 is a longitudinal section of a reinforced V-belt made according to the present invention; and FIGURE 6 is a cross-sectional view of a modified form of V-belt which is reinforced with fibers.

As shown in the drawings:

In the link chain structure illustrated in FIGURES 1 and 2, reference numeral 10 indicates the individual links of the chain, the chain being in the form of an endless loop. Each link 10 is provided with a sprocket tooth engaging recess 11 which is arranged to provide a driving connection between the links and the sprocket on which they are mounted. Between the individual links there is a hinge area identified at reference numeral 12 and consisting of a molecularly oriented area of substantial strength and possessing the integral hinge feature characteristic of polypropylene. The spacings between the relatively thin, molecularly oriented areas 12 are sufficiently small to permit the flexible belt to conform to the contour of the sprocket wheel which the chain engages. As indicated previously, the molecular orientation may be confined to the reduced thickness hinge areas 12 or the entire chain may be molecularly oriented to provide exceptionally high tensile strength.

The V-belt shown in FIGURES 3 and 4 includes relatively thick segments 13 alternating with relatively thin hinge areas 14, at least the hinge areas being flexed or otherwise treated to secure the molecular orientation required to secure the improved results of the present invention.

As indicated in FIGURE 5, the invention is applicable also to a reinforced V-belt 16 in which the reinforcing means takes the form of a fabric strip 17 embedded within the plastic body and extending through both the hinge areas and the segments of greater thickness existing between the hinge areas.

As illustrated in FIGURE 6, a V-belt 18 according to the present invention may also be reinforced with suitable reinforcing fibers 19 should such reinforcement be necessary or desirable for particular application.

The improved drive belt of the present invention makes possible an improved efficiency because materials are used which have fewer design limitations than the conventional rubber or reinforced rubber constructions presently in use. In many instances, the internal and external reinforcing means which have been used in flexible belt applications can be entirely eliminated because of the unique high strength of the new material. Furthermore, the drive belts of the present invention have improved wear characteristics because they are tougher, harder surfaced materials which nevertheless possess the required flexibility for this use arising from the integral hinge properties. One of the biggest advantages resides in the reduction in cost which is achieved through the use of the polypropylene type belts without sacrifice in tensile strength or other desirable physical characteristics in the belt.

It should be evident that various modifications can be made to the described embodiments without departing from the scope of the present invention.

I claim as my invention:

1. A flexible drive element comprising an endless loop composed of a synthetic resinous material having integral hinge properties, said loop having spaced areas of reduced thickness providing integral hinges in said areas, said reduced area portions being molecularly oriented to provide substantial tensile strength in said areas.

2. The flexible drive element of claim 1 which includes reinforcing fibers embedded within said loop.

3. The flexible drive element of claim 1 which includes a fabric reinforcement embedded within said loop.

4. A belt structure comprising an endless loop composed of a synthetic resinous material having integral hinge properties, said loop having spaced areas of reduced thickness providing integral hinges in said areas, the entire belt being molecularly oriented to provide a material of high tensile strength.

5. A belt structure comprising an endless loop composed of a polymer of propylene, said loop having spaced areas of reduced thickness providing integral hinges in said area, said reduced area portions being molecularly oriented to provide substantial tensile strength in said areas.

6. A belt structure comprising an endless loop composed of a polymer of propylene, said loop having spaced areas of reduced thickness providing integral hinges in said areas, the entire belt being molecularly oriented to provide a material of high tensile strength.

7. A chain structure comprising a plurality of links composed of a synthetic resinous material having integral hinge properties, said links having sprocket engaging recesses formed therein, the spaces between the individual links being of lesser thickness than said links and being molecularly oriented to provide areas of substantial tensile strength.

8. A V-belt structure comprising an endless loop composed of a synthetic resinous material having integral hinge properties, said loop having spaced areas of reduced thickness providing integral hinges in said areas, said reduced area portions being molecularly oriented to provide substantial strength in said areas.

9. A chain structure comprising a plurality of links composed of a polymer of propylene, said links having sprocket engaging recesses formed therein, the spaces between the individual links being of lesser thickness than said links and being molecularly oriented to provide areas of substantial tensile strength.

10. A V-belt structure comprising an endless loop composed of a polymer of propylene, said loop having spaced areas of reduced thickness providing integral hinges in said areas, said reduced area portions being molecularly oriented to provide substantial strength in said areas.

References Cited by the Examiner

UNITED STATES PATENTS

| | | | |
|---|---|---|---|
| 2,554,331 | 5/51 | Hunter | 74—238 |
| 2,847,865 | 8/58 | Rockoff et al. | 74—233 |
| 2,865,214 | 12/58 | Runton. | |
| 2,945,389 | 7/60 | Casazza | 74—233 |

FOREIGN PATENTS

| | | |
|---|---|---|
| 1,094,391 | 12/54 | France. |
| 410,522 | 3/25 | Germany. |

DON A. WAITE, *Primary Examiner.*